(12) United States Patent
Klots et al.

(10) Patent No.: US 10,333,863 B2
(45) Date of Patent: Jun. 25, 2019

(54) ADAPTIVE RESOURCE ALLOCATION BASED UPON OBSERVED HISTORICAL USAGE

(71) Applicant: Delphix Corporation, Menlo Park, CA (US)

(72) Inventors: Boris Klots, Belmont, CA (US); Subhadeep Sinha, Mountain View, CA (US); Satish Kumar, San Jose, CA (US)

(73) Assignee: DELPHIX CORP., Menlo Park, CA (US)

( * ) Notice: Subject to any disclaimer, the term of this patent is extended or adjusted under 35 U.S.C. 154(b) by 473 days.

(21) Appl. No.: 14/794,228

(22) Filed: Jul. 8, 2015

(65) Prior Publication Data
US 2015/0312169 A1 Oct. 29, 2015

Related U.S. Application Data

(62) Division of application No. 12/647,337, filed on Dec. 24, 2009, now Pat. No. 9,106,591.

(51) Int. Cl.
*H04L 12/911* (2013.01)
*H04L 12/26* (2006.01)
(Continued)

(52) U.S. Cl.
CPC ...... *H04L 47/822* (2013.01); *G06F 17/30566* (2013.01); *H04L 41/5009* (2013.01);
(Continued)

(58) Field of Classification Search
None
See application file for complete search history.

(56) References Cited

U.S. PATENT DOCUMENTS

| | | |
|---|---|---|
| 4,853,843 A | 8/1989 | Ecklund |
| 5,634,053 A | 5/1997 | Noble et al. |

(Continued)

FOREIGN PATENT DOCUMENTS

| | | |
|---|---|---|
| CN | 101473309 | 7/2009 |
| JP | 2000047919 A | 2/2000 |

(Continued)

OTHER PUBLICATIONS

Edwards, J., et al., "FlexVol: Flexible, Efficient File Volume Virtualization in WAFL," USENIX Annual Technical Conference, 2008, pp. 129-142.

(Continued)

*Primary Examiner* — Eric C Wai
(74) *Attorney, Agent, or Firm* — Fenwick & West LLP

(57) ABSTRACT

Allocation of resources across multiple consumers allows efficient utilization of shared resources. Observed usages of resources by consumers over time intervals are used to determine a total throughput of resources by the consumers. The total throughput of resources is used to determine allocation of resources for a subsequent time interval. The consumers are associated with priorities used to determine their allocations. Minimum and maximum resource guarantees may be associated with consumers. The resource allocation aims to allocate resources based on the priorities of the consumers while aiming to avoid starvation by any consumer. The resource allocation allows efficient usage of network resources in a database storage system storing multiple virtual databases.

12 Claims, 8 Drawing Sheets

US 10,333,863 B2
Page 2

(51) Int. Cl.
  *H04L 29/08* (2006.01)
  *H04L 12/927* (2013.01)
  *G06F 17/30* (2006.01)
  *H04M 15/00* (2006.01)
  *H04L 12/24* (2006.01)
  *G06F 9/46* (2006.01)

(52) U.S. Cl.
  CPC .......... *H04L 41/5022* (2013.01); *H04L 43/08* (2013.01); *H04L 43/0888* (2013.01); *H04L 47/805* (2013.01); *H04L 47/828* (2013.01); *H04L 67/10* (2013.01); *H04L 67/325* (2013.01); *H04M 15/00* (2013.01); *H04L 41/0816* (2013.01)

(56) References Cited

U.S. PATENT DOCUMENTS

| | | | |
|---|---|---|---|
| 5,680,608 A | 10/1997 | Chang et al. | |
| 5,680,618 A | 10/1997 | Freund | |
| 5,842,222 A | 11/1998 | Lin et al. | |
| 6,304,882 B1 | 10/2001 | Strellis et al. | |
| 6,469,982 B1 * | 10/2002 | Henrion | H04L 12/5602 370/230 |
| 6,523,036 B1 | 2/2003 | Hickman et al. | |
| 6,557,012 B1 | 4/2003 | Arun et al. | |
| 6,771,595 B1 * | 8/2004 | Gilbert | H04L 47/10 370/229 |
| 6,883,083 B1 | 4/2005 | Kemkar | |
| 6,920,457 B2 | 7/2005 | Pressmar | |
| 6,981,114 B1 | 12/2005 | Wu | |
| 7,197,491 B1 | 3/2007 | Chou et al. | |
| 7,222,172 B2 | 5/2007 | Arakawa et al. | |
| 7,269,607 B2 | 9/2007 | Cotner et al. | |
| 7,334,095 B1 | 2/2008 | Fair et al. | |
| 7,340,461 B2 | 3/2008 | Vishlitzky et al. | |
| 7,363,444 B2 | 4/2008 | Ji | |
| 7,409,511 B2 | 8/2008 | Edwards et al. | |
| 7,457,982 B2 | 11/2008 | Rajan | |
| 7,552,295 B2 | 6/2009 | Kern et al. | |
| 7,587,563 B1 | 9/2009 | Teterin et al. | |
| 7,653,665 B1 | 1/2010 | Stefani et al. | |
| 7,653,794 B2 | 1/2010 | Michael et al. | |
| 7,725,440 B2 | 5/2010 | Reed et al. | |
| 7,757,056 B1 | 7/2010 | Fair | |
| 7,779,051 B2 | 8/2010 | Friedlander et al. | |
| 7,792,802 B1 | 9/2010 | Rao | |
| 7,809,769 B2 | 10/2010 | Butcher et al. | |
| 7,836,267 B1 | 11/2010 | Cross | |
| 7,895,228 B2 | 2/2011 | Cragun et al. | |
| 7,953,704 B2 | 5/2011 | Anderson et al. | |
| 7,953,749 B2 | 5/2011 | Sinha et al. | |
| 8,255,915 B1 | 8/2012 | Blanding et al. | |
| 8,341,119 B1 | 12/2012 | Roussos et al. | |
| 8,560,657 B2 * | 10/2013 | Williams | H04L 41/0681 709/223 |
| 8,732,417 B1 | 5/2014 | Stringham | |
| 9,152,503 B1 | 10/2015 | Fair | |
| 2002/0143764 A1 | 10/2002 | Martin et al. | |
| 2003/0158861 A1 | 8/2003 | Sawdon et al. | |
| 2003/0204597 A1 | 10/2003 | Arakawa et al. | |
| 2003/0229656 A1 | 12/2003 | Hitz et al. | |
| 2004/0054648 A1 | 3/2004 | Mogi et al. | |
| 2005/0114701 A1 | 5/2005 | Atkins et al. | |
| 2005/0246397 A1 | 11/2005 | Edwards et al. | |
| 2006/0140115 A1 | 6/2006 | Timus et al. | |
| 2006/0179261 A1 | 8/2006 | Rajan | |
| 2006/0212481 A1 | 9/2006 | Stacey et al. | |
| 2006/0230243 A1 | 10/2006 | Cochran et al. | |
| 2006/0242381 A1 | 10/2006 | Shatskih et al. | |
| 2007/0055710 A1 | 3/2007 | Malkin | |
| 2007/0124341 A1 | 5/2007 | Lango et al. | |
| 2007/0219959 A1 | 9/2007 | Kanemasa | |
| 2007/0220065 A1 | 9/2007 | Coyle et al. | |
| 2007/0260628 A1 | 11/2007 | Fuchs et al. | |
| 2007/0294215 A1 | 12/2007 | Boss et al. | |
| 2008/0037553 A1 | 2/2008 | Gilmartin et al. | |
| 2008/0183973 A1 | 7/2008 | Aguilera et al. | |
| 2008/0225665 A1 | 9/2008 | Reckless | |
| 2008/0247314 A1 | 10/2008 | Kim et al. | |
| 2008/0256314 A1 | 10/2008 | Anand et al. | |
| 2008/0306904 A1 | 12/2008 | Fukuda et al. | |
| 2009/0031292 A1 | 1/2009 | Fulton et al. | |
| 2009/0055604 A1 | 2/2009 | Lemar et al. | |
| 2009/0080398 A1 | 3/2009 | Mahany et al. | |
| 2009/0083339 A1 | 3/2009 | Reed et al. | |
| 2009/0132611 A1 | 5/2009 | Brown et al. | |
| 2009/0144224 A1 | 6/2009 | Phan et al. | |
| 2009/0177697 A1 | 7/2009 | Gao et al. | |
| 2009/0288084 A1 | 11/2009 | Astete et al. | |
| 2009/0292734 A1 | 11/2009 | Miloushev et al. | |
| 2009/0292890 A1 | 11/2009 | Sampathkumar | |
| 2010/0058106 A1 | 3/2010 | Srinivasan et al. | |
| 2010/0125844 A1 | 5/2010 | Mousseau et al. | |
| 2010/0131959 A1 | 5/2010 | Spiers et al. | |
| 2010/0174190 A1 | 7/2010 | Hancock et al. | |
| 2010/0250493 A1 | 9/2010 | Adkins et al. | |
| 2010/0250880 A1 | 9/2010 | Mimatsu | |
| 2010/0299368 A1 | 11/2010 | Hutchins et al. | |
| 2011/0004586 A1 | 1/2011 | Cherryholmes et al. | |
| 2011/0004676 A1 | 1/2011 | Kawato | |
| 2011/0072224 A1 | 3/2011 | Popovski et al. | |
| 2011/0208755 A1 | 8/2011 | Fiske | |
| 2011/0264821 A1 * | 10/2011 | Van Leekwijck | H04L 41/0896 709/235 |

FOREIGN PATENT DOCUMENTS

| | | |
|---|---|---|
| JP | 2004-110218 | 4/2004 |
| JP | 2005532611 A | 10/2005 |
| JP | 2009-530756 | 8/2009 |

OTHER PUBLICATIONS

Klivanksky, M., et al., A Thorough Introduction to FlexCone Volumes, Network Appliance Inc., Technical White Paper, Oct. 2004, pp. 1-35, can be retrieved at <URL:www.tech.proact.co.uk/netapp/flexclone_volumes.pdf>.

Lal, J., et al., "DB2: Cloning a Database using NetApp FlexClone Technology", NetApp, TR-3460, Apr. 30, 2006, pp. 1-60.

Patterson, H., et al., "SnapMirror: File System Based Asynchronous Mirroring for Disaster Recovery", Proceedings of the FAST 2002 Conference on File and Storage Technologies, Jan. 28-30, 2002, 14 pages.

Office Action for Australian Patent Application No. AU 2015203259, dated May 4, 2016, 4 Pages.

Office Action for U.S. Appl. No. 14/684,291, dated Feb. 2, 2016, 13 Pages.

Office Action for Korean Patent Application No. KR 10-2012-7012816, dated Nov. 25, 2015, 5 Pages.

Office Action for Korean Patent Application No. KR 10-2012-7012816, dated Nov. 25, 2015, 7 Pages.

Office Action for Canadian Patent Application No. CA 2,778,415, dated Nov. 12, 2015, 3 Pages.

Notice of Grounds for Rejection for Japanese Patent Application No. P2014-155597, dated Apr. 21, 2015, 5 Pages.

Kakinoki, T., et al., "Query Language for Enterprise Data Integration in SaaS Environment," Institute of Electronics, Information and Communication Engineers, Data Engineering Workshop Collected Papers No. 19, (DEWS 2008 C3-1), Japan, The Institute of Electronics, Information and Communication Engineers, Data Engineering Research Committee, Apr. 7, 2008, 4 Pages. (With English Abstract).

Office Action for U.S. Appl. No. 12/647,337, dated Jun. 10, 2014, 10 Pages.

Office Action for U.S. Appl. No. 12/647,337, dated Jun. 20, 2013, 10 Pages.

Office Action for U.S. Appl. No. 12/647,337, dated Nov. 26, 2012, 14 Pages.

(56) References Cited

OTHER PUBLICATIONS

Prasad, Sts., et al., "Virtual Database Technology, XML, and the Evolution of the Web", IEEE Computer Society Technical Committee on Data Engineering, 1998, pp. 1-5.
Rajaraman, A., et al., "Virtual Database Technology: Transforming the Internet into a Database", IEEE Internet Computing, Jul./Aug. 1998, pp. 55-58.
Sadagopan, S., "Introduction to WebSphere Federation Sewer", IBM Data Management Solutions, 2005, pp. 1-45.
Wilson, A.J., et al., "Multiple Virtual Databases to Support Multiple VOS in R-GMA", CCLRC-Rutherford Appleton Laboratory, UK, 2006, 3 Pages.
"Virtual Databases", Jan. 7, 2008, 4 Pages, [online] [Retrieved on Sep. 19, 2011] Retrieved from the internet <URL:www.db2dean.com/PreviouslVirtualDB.html>.
PCT International Search Report and Written Opinion, PCT/US2010/052963, dated Dec. 10, 2010, 16 Pages.
PCT International Search Report and Written Opinion, PCT/US2010/052960, dated Dec. 10, 2010, 17 Pages.
PCT International Search Report and Written Opinion, PCT/US2010/060536, dated Feb. 28, 2011, 12 Pages.
"FlexVol.TM. abd FlexClone.TM. Software," Datasheet, Network Appliance, Inc., 2004, 2 Pages.
"FlexClone" Datasheet, Network Appliance, Inc., 2008, 2 Pages.
"NetApp SnapMirror," Datasheet, Network Appliance, Inc., 2008, 2 Pages.
"NetApp Snapshot Technology," Datasheet, Network Appliance, Inc., 2004, 1 Page.
"NetApp SnapManager for Oracle," Datasheet, Network Appliance, Inc., 2008, 2 Pages.
Meeks, J., "An Oracle Technical White Paper—Oracle Data Guard with Oracle Database 11g Release 2," Oracle, Sep. 2009, 20 Pages.
U.S. Appl. No. 12/603,545, filed Oct. 21, 2009, 104 pages.
U.S. Appl. No. 12/603,541, filed Oct. 21, 2009, 104 pages.
Office Action for U.S. Appl. No. 13/316,263, dated Jan. 14, 2013, 7 Pages.
Office Action for Japanese Patent Application No. P2012-535259, dated Nov. 26, 2013, 8 Pages.
Patent Examination Report for Australian Patent Application No. 2010310827, dated Mar. 20, 2014, 3 Pages.
Harbow, L., "Precisely administrate the virtual environment of hybrid type, Part 2: Thorough review of top 5 products of "High-availability plus Disaster-Recovery" for the virtual environment," Computerworld, Japan, Kabushiki Kaisha IDG Japan, Jan. 1, 2009, vol. 6, No. 1, pp. 42-51. (English Translation Is Not Readily Available).
Supplementary European Search Report for European Patent Application No. EP 10825453, dated Jun. 28, 2013, 8 Pages.
Supplementary European Search Report for European Patent Application No. EP 10825452, dated Jun. 28, 2013, 8 Pages.
Office Action for U.S. Appl. No. 13/329,132, dated Oct. 22, 2013, 10 Pages.
Patent Examination Report for Australian Patent Application No. 2010310828, dated Mar. 17, 2014, 3 Pages.
Office Action for Chinese Patent Application No. CN 201080058431.3, dated May 7, 2014, 24 Pages.
Chinese Second Office Action, Chinese Application No. 2010800584313, dated Dec. 16, 2014, 5 pages.
Pan, A. et al, "A Virtual Database Management System for the Internet", 2002, 10 pages.
Extended European Search Report for European Patent Application No. EP 10839995.7, dated Mar. 2, 2015, 6 pages.
Communication Pursuant to Article 94(3) EPC for European Patent Application No. EP 10825453.3 dated Oct. 1, 2015, 9 Pages.
Communication Pursuant to Article 94(3) EPC for European Patent Application No. EP 10839995.7, dated May 11, 2018, 5 Pages.

\* cited by examiner

ADAPTIVE RESOURCE ALLOCATION BASED UPON OBSERVED HISTORICAL USAGE

RELATED APPLICATIONS

This application is a divisional of U.S. patent application Ser. No. 12/647,337 filed on Dec. 24, 2009, which is incorporated by reference herein in its entirety.

BACKGROUND

This invention relates generally to resource management for storage systems, and in particular to adaptive management of resources shared by multiple consumers.

Virtualization technologies allow hardware resources to be used and shared by multiple consumers. A consumer can be a process running on a computer system that accesses resources to perform certain tasks. An example of consumer is a task related to database operations on a system hosting databases, for example, query processing, data manipulations, reporting, replication, backup, restore, or export. These tasks can require significant amount of system resources. An example of a shared hardware resource is network resource that allows consumers to communicate with external systems. Another example is a bandwidth of storage subsystem. Shared resources are allocated between various consumers. The allocation of resources to individual consumers determines the overall utilization of the hardware resources in a system.

Consumers of resources may be associated with priorities based on the consumer's importance to an end user. For example, certain consumers perform tasks that have higher priority than other consumers or have tighter service level agreements (SLA) requirements. Allocation of hardware resources between consumers need to consider their priorities. Allocations aim to ensure that higher priority tasks get a larger share of resources than lower priority tasks. However, even a low priority task should be able to make progress over time, although its progress may be slow compared to high priority tasks. Improper allocation of resources to consumers may result in starvation of some consumers and hoarding of resources by other consumers. Starvation of a consumer results when the consumer is perpetually denied resources that it needs.

Various strategies are utilized to share resources between consumers. A fixed resource allocation strategy can allocate fixed amount of resources to different consumers based on their priorities. In many cases these fixed amounts are determined upfront or are results of explicit operator input. Fixed resource allocation strategies may not be able to automatically adjust to dynamic changes in consumer needs. A proportional fairness based resource allocation strategy allocates an amount of resources for each consumer proportionate to its anticipated resource consumption. Another resource allocation strategy is a round robin strategy that iterates through consumers in a round robin fashion to allocate resources. Other types of allocation strategies include first come first served type of allocation, fair queuing (max-min fairness) and weighted queuing.

SUMMARY

Virtualization of databases allows consolidation of multiple virtual databases on the same database storage system. Multiple tasks associated with the virtual databases may execute on the storage system including, loading of the databases, provisioning of the virtual databases, and serving of requests and tasks related to the virtual databases. These tasks are consumers of system and hardware resources, for example, network resources and storage bandwidth. The goal is the allocation of resources for the consumers optimizes that optimizes the overall utilization of the resources for the system across multiple virtual databases with respect to their SLAs and priorities. Resources are distributed among various consumers depending on their dynamic needs and required SLAs.

Embodiments of the invention enable allocation of network resources to consumers of different priorities in a computer system. A metric representing the aggregate needs of a low priority set of consumers of the network resources is determined based on observed usage of the network resources by the consumers. The metric representing the needs of the low priority set of consumers is compared to a threshold value. If the needs of the low priority consumers are above a threshold value, allocations of the network resource are first determined for a high priority set of consumers. After allocating the resources to the high priority set of consumers, a remaining amount of left over allocations is determined and allocated to the low priority set of consumers. In an embodiment, resources can be allocated to the high-priority customers up to the total amount of resources minus the amounts guaranteed to the lower priority consumers.

In an embodiment, if the metric representing the needs of the consumers is below a threshold value, the allocations of the low priority consumers are determined first and the remaining leftover resources are allocated to the high-priority consumers. Any resources still remaining are distributed over all the consumers.

Embodiments of the invention enable computation of total throughput of network resources used by consumers. Multiple usage values of the network resource that are cumulative over time are determined. Each cumulative usage value is associated with a time interval and is based on observed usages of network resource by consumers over the time interval. The total throughput of the network resource is determined based on an aggregate value based on the multiple cumulative usage values. The total throughput value is increased by a predetermined factor. Allocations of the network resource for each consumers of the network resource are determined based on the increased total throughput value.

Each allocation for a consumer determines the availability of the network resource to the consumer for a subsequent time interval. The system assumes certain guarantees for individual users and for priority groups. If these guaranteed amounts are unlikely to be consumed based on the forecasting of the described method, the surplus part of the resource will be allocated to other consumers.

The features and advantages described in this summary and the following detailed description are not all-inclusive. Many additional features and advantages will be apparent to one of ordinary skill in the art in view of the drawings, specification, and claims.

Figure 1:
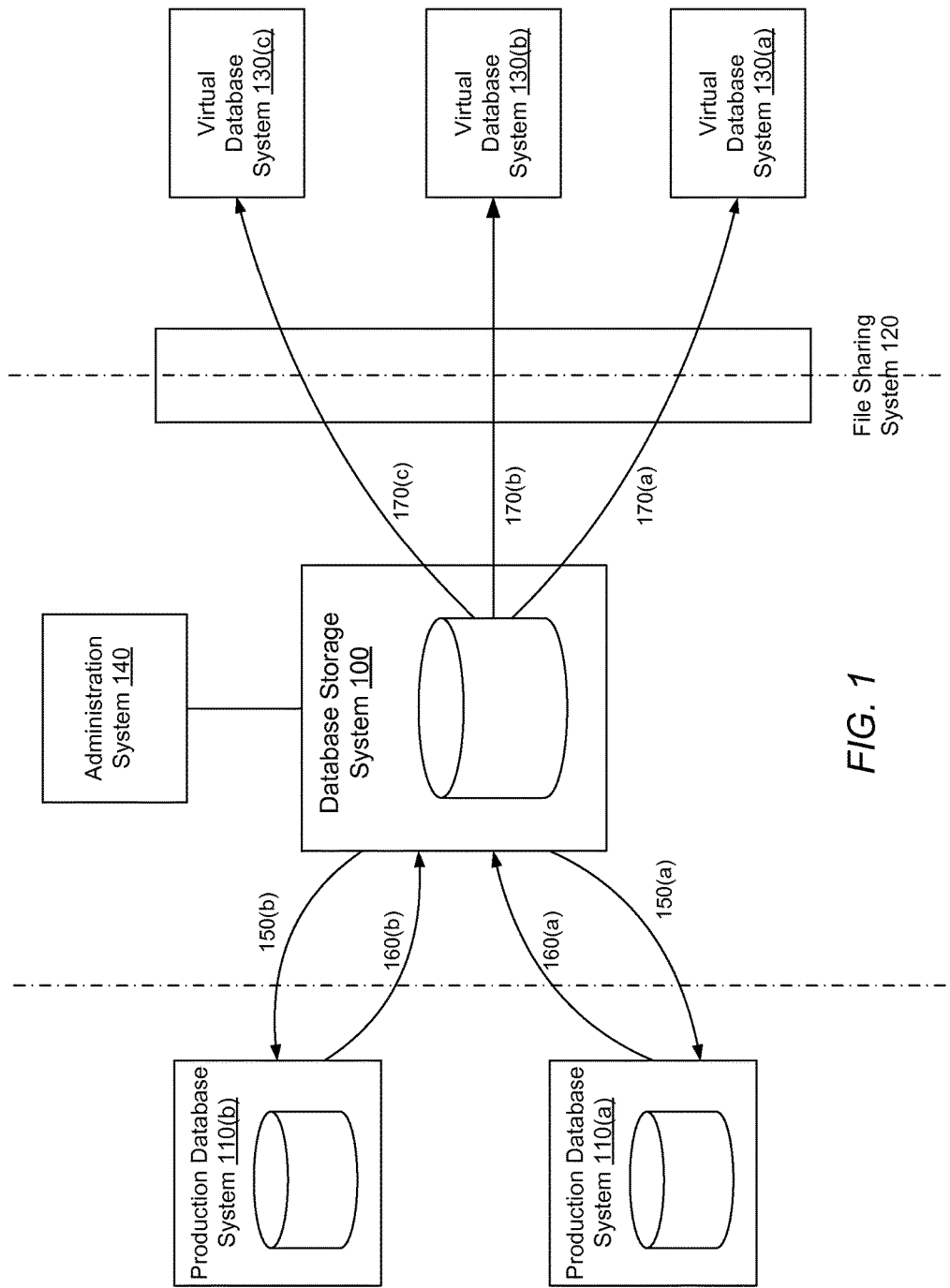
FIG. 1 is diagram illustrating how information is copied from a production database to a database storage system and provisioned as virtual databases using a file sharing system, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Virtual Databases as Consumers of Resources

Creation of virtual databases allows storage of multiple virtual databases in a database storage system. Storage of multiple virtual databases on a database storage system requires execution of multiple tasks related to the virtual databases on the database storage system. These tasks include creation of virtual databases, tasks related to use of virtual databases including query processing, data manipulations, replication, backup, restore, export of virtual databases and the like. These tasks share hardware resources available on the database storage systems and act as consumers of the shared resources. Different tasks can be associated with different priority levels which may be determined by a system administrator. The resources shared by different consumers need to be allocated between the consumers appropriately, for example, higher priority consumers may be given larger share of resources compared to lower priority consumers. In an embodiment, the allocation of resources ensures that lower priority tasks are not starved of resources. In another embodiment, some lower priority tasks may be starved but are allowed to continue to exist in the system. The system aims at optimizing the overall usage of the shared resources across various consumers with respect to their priorities.

In an embodiment, usage of shared resources is optimized across multiple modules of virtual database systems stored on a database storage system. Virtual databases can be created based on the state of a production database at a particular point in time, and the virtual databases can then be individually accessed and modified as desired. A database comprises data stored in a computer or storage subsystem for use by computer implemented applications. A database server is a computer program that can interact with the database and provides database services, for example, access to the data stored in the database. Database servers include commercially available programs, for example, database servers included with database management systems provided by ORACLE, SYBASE, MICROSOFT SQL SERVER, IBM's DB2, MYSQL, and the like. The term "production database" is used in particular examples to illustrate a useful application of the technology; however, it can be appreciated that the techniques disclosed can be used for any database, regardless of whether the database is used as a production database. The virtual databases are "virtual" in the sense that the physical implementation of the database files is decoupled from the logical use of the database files by a database server. Systems and methods for creating virtual databases and using them in workflows are disclosed in U.S. application Ser. No. 12/603,545 filed on Oct. 21, 2009, which is incorporated by reference in its entirety.

In one embodiment, information from the production database is copied to a storage system at various times, such as periodically. This enables reconstruction of the database files associated with the production database for these different points in time. The information may be managed in the storage system in an efficient manner so that copies of information are made only if necessary. For example, if a portion of the database is unchanged from a version that was previously copied, that unchanged portion need not be copied. A virtual database created for a point in time is stored as a set of files that contain the information of the database as available at that point in time. Each file includes a set of database blocks and the data structures for referring to the database blocks stored for earlier copies. A virtual database may be created on a database server by creating the database files for the production database corresponding to the state of the production database at a previous point in time, as required for the database server. The files corresponding to the virtual database are made available to the database server using a file sharing mechanism, which links the virtual database to the appropriate database blocks stored on the storage system. The process of making the virtual database available to a database server is called "provisioning" the virtual database. In some embodiments, provisioning the virtual database includes managing the process of creating a running database server based on virtual database. Multiple VDBs can be provisioned based on the state of the production database at the same point in time. On the other hand, different VDBs can be based on different point in time state of the same production database or different production databases. The database server on which a virtual database has been provisioned can then read from and write to the files stored on the storage system. A database block may be shared between different files each file associated with a different VDB.

FIG. 1 illustrates one embodiment illustrating how information may be copied from a production database to a database storage system and provisioned as virtual databases using a file sharing system. The production database systems 110 manage data for an organization. The database storage system 100 retrieves data associated with databases from one or more production database systems 110 and stores the data in an efficient manner, further described below. A database administrator user interface 140 allows a database administrator to perform various actions supported by the database storage system 100.

In response to a request from the administrator system 140, or based on a predefined schedule, the database storage system 100 may send a request 150 for data to a production database system 110. The production database system 110 responds by sending information stored in the production database as a stream of data 160. The request 150 is sent periodically and the production database system 110 responds by sending information representing changes of data stored in the production database since the last response 160 sent by the production database system 110. The database storage system 100 receives the data 160 sent by the production database system 110 and stores the data. The database storage system 100 may analyze the data 160 received to determine whether to store the information or skip the information if the information is not useful for reconstructing the database at previous time points. The database storage system 100 stores the information efficiently, for example, by keeping versions of database blocks that have changed and reusing database blocks that have not changed.

To create a virtual database, the database storage system 100 creates files that represent the information corresponding to the production database system 110 at a given point in time. The database storage system 100 exposes 170 the corresponding files to a virtual database system 130 using a file sharing system 120. The virtual database system 130 runs a database server that can operate with the files exposed 170 by the database storage system 100. Hence, a virtual copy of the production database is created for the virtual database system 130 for a given point in time in a storage efficient manner.

Modules in the database storage system 100 require resources to perform tasks. The resources can be network resources for communicating with external systems, computing resources or other resources. For example, the virtual database manager 275 may need resources for provisioning a VDB, the point-in-time copy manager 210 may need network resources for retrieving a point-in-time copy of a database from the production database system 110, the transaction log manager 220 may need network resources for retrieving log updates from a production database system 110, the virtual database manager 275 may need resources for exporting the data in a VDB to an external system. A task performed by a module utilizing a resource is a consumer of the resource.

System Architecture

Figure 2:
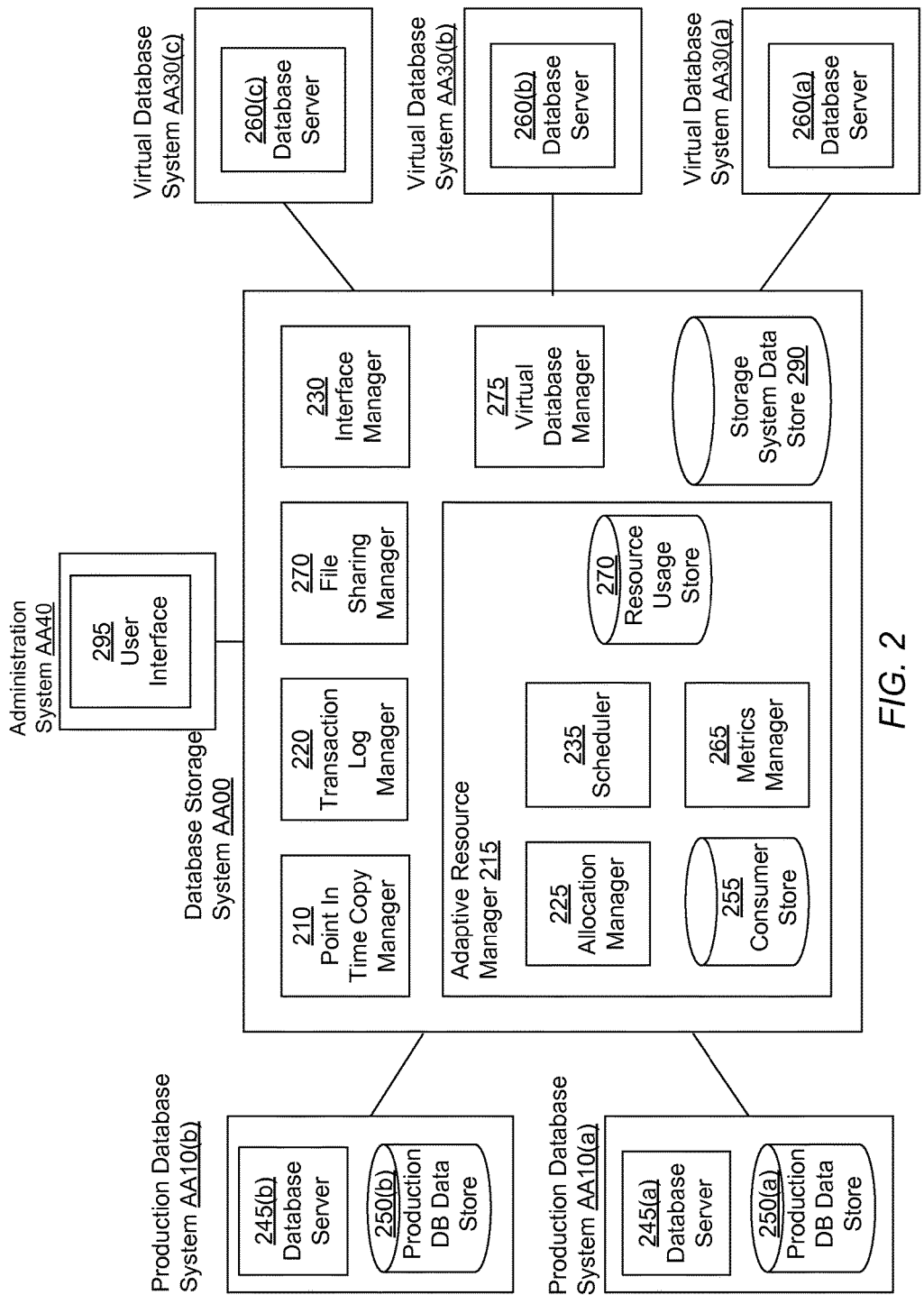
FIG. 2 is a schematic diagram of the architecture of a system that makes stores virtual databases and optimizes the shared resources for tasks related to the virtual databases, in accordance with an embodiment of the invention.

FIG. 2 shows is a high level block diagram illustrating a system environment suitable for managing virtual databases on a database storage system 100 and optimizing overall resources used by the VDBs stored on the database storage system 100. The system environment comprises one or more production database systems 110, a database storage system 100, an administration system 140, and one or more virtual database systems 130. Systems shown in FIG. 2 can communicate with each other if necessary via a network.

A production database system 110 is typically used by an organization for maintaining its daily transactions. For example, an online bookstore may save all the ongoing transactions related to book purchases, book returns, or inventory control in a production system 110. The production system 110 includes a database server 245 and a production DB data store 250. The production DB data store 250 stores data associated with a database that may represent for example, information representing daily transactions of an enterprise. The database server 245 processes requests that access data stored in the production DB data store 250. In alternative configurations, different and/or additional modules can be included in a production database system 110.

The database storage system 100 retrieves information available in the production database systems 110 and stores it. The information retrieved includes database blocks comprising data stored in the database, transaction log information, metadata information related to the database, information related to users of the database and the like. The information retrieved may also include configuration files associated with the databases. For example, databases may use vendor specific configuration files to specify various configuration parameters including initialization parameters associated with the databases.

The data stored in the storage system data store 290 can be exposed to a virtual database system 130 allowing the virtual database system 130 to treat the data as a copy of the production database stored in the production database system 110. The database storage system 100 includes a point-in-time copy manager 210, a transaction log manager 220, a interface manager 230, a file sharing manager 270, a virtual database manager 275, a storage system data store 290, and an adaptive resource manager 215. The adaptive resource manager 215 comprises various modules including an allocation manager 225, a scheduler 235, a consumer store 255, a metrics manager 265 and a resource usage store 270. In alternative configurations, different and/or additional modules can be included in the database storage system 100.

The point-in-time copy manager 210 interacts with the production database system 110 by sending a request to retrieve information representing a point-in-time copy (also referred to as a "PIT copy") of a database stored in the production DB data store 250. The point-in-time copy manager 210 stores the data obtained from the production database system 110 in the storage system data store 290. The data retrieved by the point-in-time copy manager 210 corresponds to database blocks (or pages) of the database being copied from the production DB data store 250. After a first PIT copy request to retrieve information production DB data store 250, a subsequent PIT copy request may need to retrieve only the data that changed in the database since the previous request. The data collected in the first request can be combined with the data collected in a second request to reconstruct a copy of the database corresponding to a point in time at which the data was retrieved from the production DB data store 250 for the second request.

The transaction log manager 220 sends request to the production database system 110 for retrieving portions of the transaction logs stored in the production database system 110. The data obtained by the transaction log manager 220 is stored in the storage system data store 290. In one embodiment, a request for transaction logs retrieves only the changes in the transaction logs in the production database system 110 since a previous request for the transaction logs was processed. The database blocks retrieved by a point in time copy manager 210 combined with the transaction logs retrieved by the transaction log manager 220 can be used to reconstruct a copy of a database in the production system 110 corresponding to times in the past in between the times as which point-in-time copies are made.

The file sharing manager 270 allows files stored in the storage system data store 290 to be shared across computers that may be connected with the database storage system 100 over the network. The file sharing manager 270 uses the file sharing system 120 for sharing files. An example of a system for sharing files is a network file system (NFS). A system for sharing files may utilize fibre channel Storage area networks (FC-SAN) or network attached storage (NAS) or combinations and variations thereof. The system for sharing files may be based on small computer system interface (SCSI) protocol, internet small computer system interface (iSCSI) protocol, fibre channel protocols or other similar and related protocols.

The virtual database manager 275 receives requests for creation of a virtual database for a virtual database system 130. The request for creation of a virtual database may be sent by a database administrator using the administration system 140 and identifies a production database system 110, a virtual database system 130, and includes a past point-in-time corresponding to which a virtual database needs to be created. The virtual database manager 275 creates the necessary files corresponding to the virtual database being created and shares the files with the virtual database system 130 using the file sharing manager 270.

The interface manager 230 renders for display information necessary for display using the administration system 140. A database administrator user can see information available in the storage system data store 290 as well as take actions executed by the database storage system. For example, the database administrator can request the database storage system 100 to make a PIT copy of a database stored on a production database system 110 at a particular point-in-time. In an embodiment, the interface manager allows a system administrator to set various priorities associated with different tasks. The system administrator can also set minimum and maximum guarantees of allocation associated with various tasks.

The adaptive resource manager 215 contains various modules necessary to allocate shared resources between tasks representing consumers of the shared resources. The consumer store 255 maintains data structures representing consumers in the database storage system 100. The consumer store 255 stores the priority and sub-priority associated with each consumer. Consumers may be added to or deleted from the consumer store 255. A consumer may have a status, for example, pending or active. The resource usage store 270 stores information related to various resources available to the consumers in the database storage system 100 and information representing the usage of the resources.

The allocation manager 225 determines the allocations of various consumers for a given time interval. The allocation manager performs an allocation run comprising analysis of usage of resources based on information available in the resource usage store 270 and of consumer information available in consumer store 255 to determine allocations of resources across different consumers. In an embodiment, the allocation manager determines allocations of resources periodically, where results of each allocation run are used for a subsequent time interval.

The scheduler 235 periodically invokes the allocation manager 225 to execute a run of the allocation including collection and analysis of usages of resources by various consumers and to determine allocation of the resources for the next time interval. In an embodiment, the allocation manager 225 invokes the scheduler to schedule the next run of the allocation manager 225. The scheduler may get scheduling requests from other modules, for example, from the interface manager 230 that forwards requests made by a system administrator using the administration system 140. The scheduler 235 may be implicitly invoked by execution of specific tasks, for example, when a consumer is created or deleted.

The metrics manager 265 gathers statistics for use by other modules or for reporting via the user interface 295. Examples of data reported include observed usage per consumer, 'unhappiness' index associated with consumers described herein, overall resource usage and the like. In an embodiment, the metrics manager maintains a cache that stores frequently accessed information for fast access. The metrics manager 265 may receive and process requests for information from the user interface 295 for display via the user interface 295.

A virtual database system 130 includes a database server 260. The database server 260 is similar in functionality to the database server 245 and is a computer program that provides database services and application programming interfaces (APIs) for managing data stored on a data store 250. The data managed by the database server 260 may be stored on the storage system data store 290 that is shared by the database storage system 100 using a file sharing system 120. In alternative configurations, different and/or additional modules can be included in a virtual database system 130. Some data can be stored on local storage.

Consumer Priority Hierarchy

A consumer is assigned to a priority group that determines the preference in allocation of resources for the consumer. There can be multiple priority groups that each consumer can be assigned to. Each consumer is assigned to only one priority group at a time. The consumer can be dynamically reassigned to a different priority group if necessary. The assignment of priority groups can be performed based on a default priority group when the consumer is added to the system or by a database administrator using the user interface 295. Alternatively consumers can be automatically mapped to priority groups based on attributes of the consumer. Automatic assignments can be subject to change by a database administrator.

Figure 3:
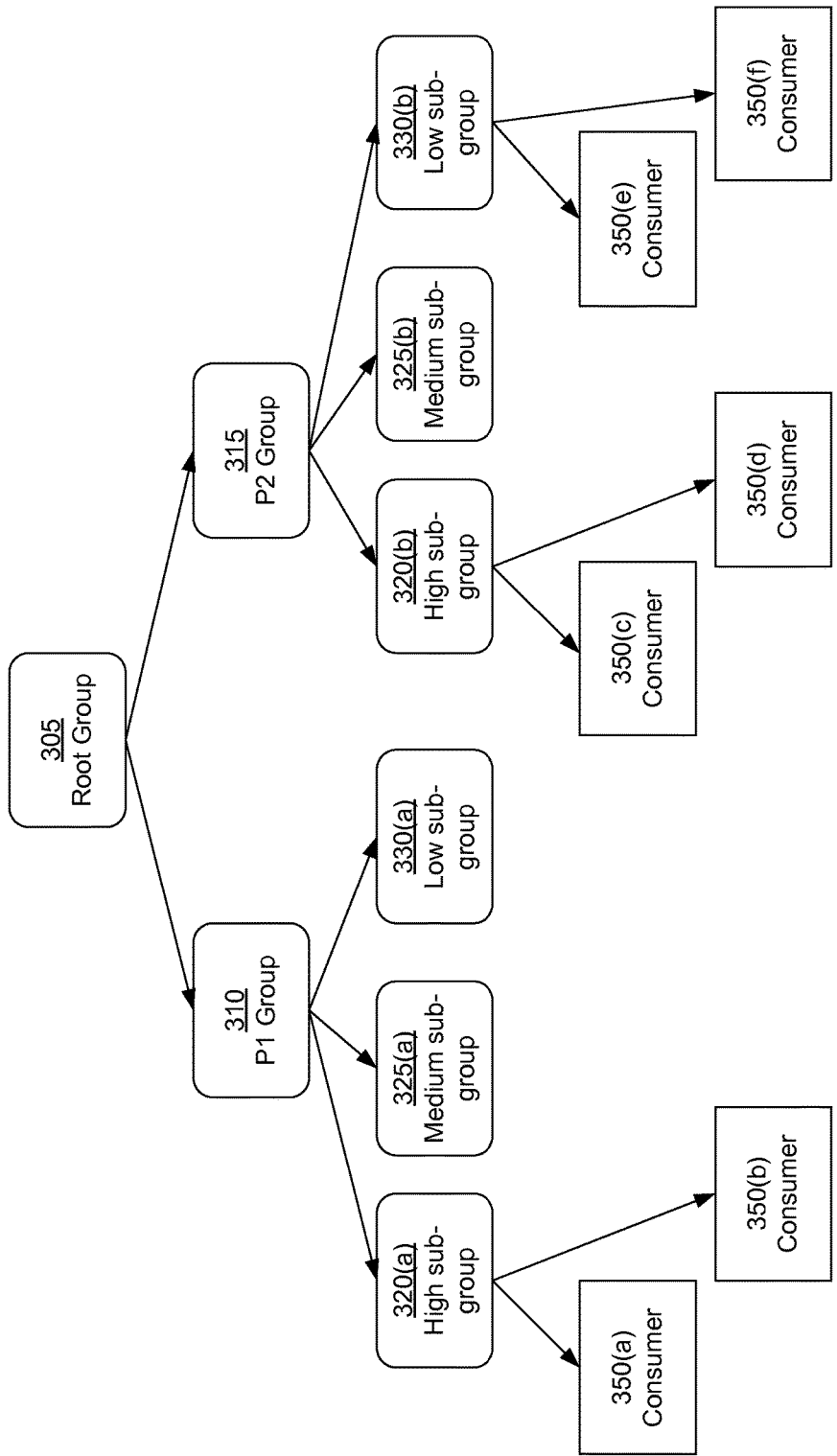
FIG. 3 illustrates a hierarchy of priority groups and assignment of consumers to priority groups, in accordance with an embodiment of the invention.

FIG. 3 illustrates an embodiment in which a consumer can be assigned to one of two priority groups, P1 (high priority group 310) and P2 (regular priority group 315). By default all consumers can be assigned to the priority group P2. A database administrator can reassign a consumer from P2 to P1 priority group if necessary. Each of the priority group may be sub-divided into sub-groups.

As illustrated in FIG. 3, each priority is divided into sub-groups, for example, high sub-group 320, medium sub-group 325, and low subgroup 330. The high sub-group 320 includes consumers with priority higher than the consumers in medium sub-group 325 which in turn have priority higher than consumers in low subgroup 330. Similar to a default priority group being assigned to a consumer, a default sub-group within the priority group can be assigned to each consumer. A database administrator can reassign the sub-group of a consumer if necessary. FIG. 3 shows a root group 305 that includes all priority groups underneath. In some embodiments, the root group 305 can be used as the default priority group for the resources. Note that other embodiments can have a hierarchy of priority groups and sub-groups of arbitrary depth and width.

In one embodiment a consumer 350(*e*) is assigned to the lowest level of priority group in the hierarchy of priority-groups as shown in FIG. 3. In other embodiments, the consumer 350 can be assigned to any priority group in the hierarchy. For example, a consumer can be assigned to the P1 group 310, and may be assigned to a sub-group assigned by default. The parent of a consumer 350 is the group that the consumer belongs to in the priority group hierarchy.

Resources Used by Consumers

Figure 4:
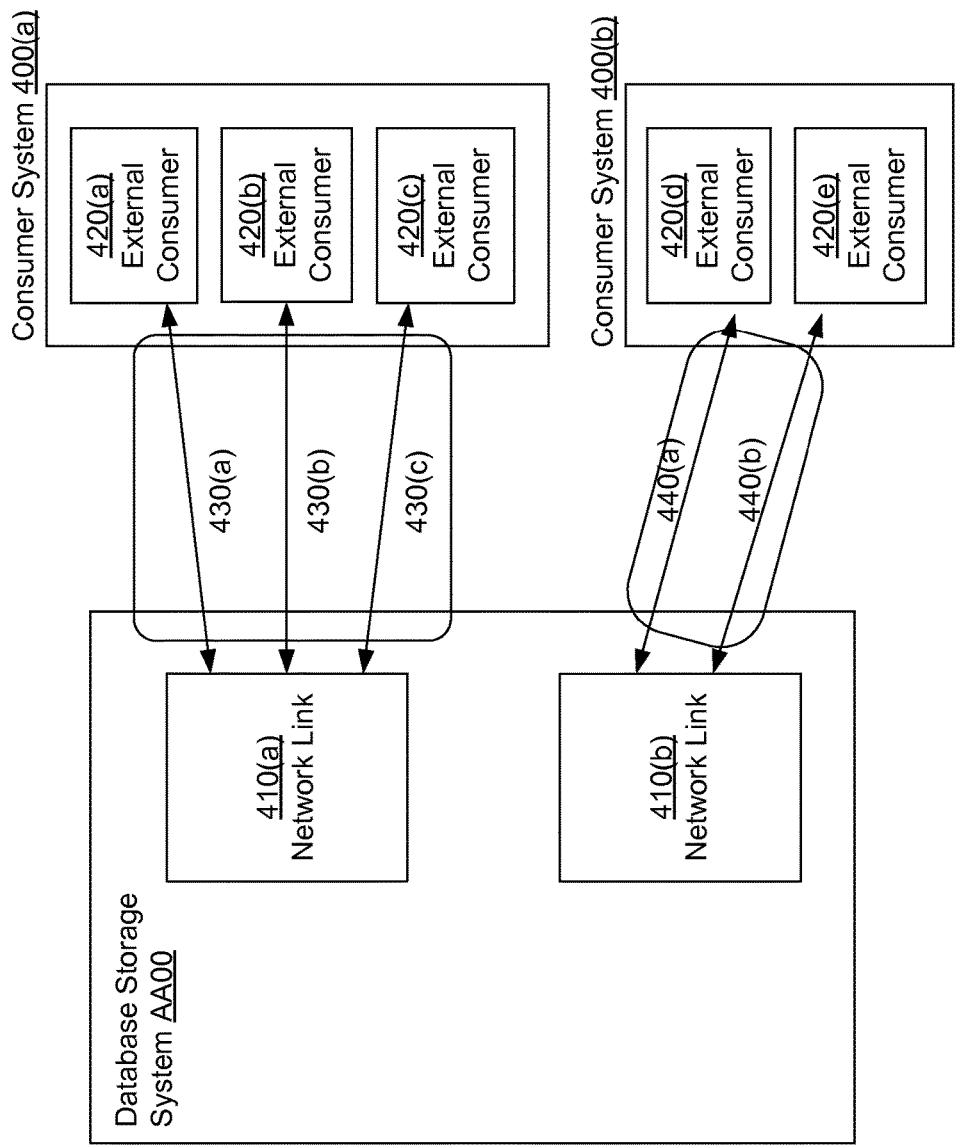
FIG. 4 illustrates network links and flows associated with consumers, in accordance with an embodiment of the invention.

FIG. 4 illustrates network and bandwidth resources used by consumers in the database storage system 100, for example, network links and flows associated with consumers. The database storage system 100 is connected to one or more external consumers 430. For example, a consumer can be the task of retrieving a point-in-time copy from a production database system 110 or the task of exporting a virtual database system 130. A network resource of the database storage system 100 that is shared by multiple external consumers is called a network link 410. Multiple external consumers that share a network link 410 can be executing on the same remote computer or on different remote computers. Although a remote computer can share multiple network links, each external consumer 420 is assigned to a single network link 430. If there are multiple links 410 connected to a remote computer, different external consumers 420 on the remote computer can be assigned to different links. Typically, there is bidirectional network traffic between an external consumer 420 and the database storage system 100. In an embodiment, each network link 410 can be associated with an aggregate of network interface controllers (NICs) or a single NIC.

Each network link 430 has a stated linkcapacity that specifies the bandwidth supported by the network link 430. The stated link capacity of the network link 430 may be specified by the vendor of the network link 410. However the actual bandwidth that is obtained when the network link 410 is used in a system can be different from the stated bandwidth since the actual bandwidth may depend on several factors, including network configurations, configuration and capacity of storage of the database storage system 100, nature of the workload, and the caching properties of the consumer tasks.

The portion of the resource associated with a network link 410 that is assigned to a consumer is called a flow 430. Hence, each external consumer 420 is assigned a flow 430 as shown in FIG. 4. A flow 430 is associated with attributes including, a network link 410 used by the flow, a priority value associated with the flow, and a network port on the database storage system 100 used by the flow. Typically, there is bidirectional network traffic associated with the flow 430 between the external consumer 420 associated with the flow and the database storage system 100. The database storage system 100 can enforce limits on the bandwidth available to a flow 430. The priority associated with a flow 430 typically depends on the priority of the associated consumer. The database storage system 100 throttles the network traffic through each flow to guarantee specific bandwidth to each consumer.

In an embodiment, corresponding to each external consumer 430 task, there is a consumer task executing on the database storage system 100. The information related to the consumer in the database storage system 100 is stored in the consumer store 255. Information related to the resources including network links is stored in the resource usage store 270.

Total Throughput Discovery

A link's total throughput is the aggregated network bandwidth available to all consumers using this particular link. Portions of the network bandwidth available on a link are allocated to the consumers associated with the link. The appropriate portion allocated to a consumer is calculated based on the total throughput. However, as described above, the total throughput depends on the actual bandwidth available using the link that depends on several factors and needs to be estimated. Also, the total throughput can change over time based on the changes in the factors that affect the overall bandwidth of the link.

The metrics manager 265 of the adaptive resource manager 215 stores the previously estimated resource usages of the network links 410 in the resource usage store 270. The previously estimated resource usage data is used to estimate the total throughput for network links 410. The significance and influence of the values of the past observations of resource usage are diminished over time to accommodate for changes in workloads, and storage or network configurations that affect the total throughput.

In an embodiment, a predetermined parameter lookback determines the length of historic time interval used to estimate the total throughput. All observed resource usages between the present time t and the previous time point (t-lookback) are used to determine the total throughput. However resource usage data prior to the time (t-lookback) is not considered. In another embodiment, a decay parameter is considered that reduces the contribution due to older values of resource usage. The decay parameter may reduce the importance of previous values by a factor depending on the age of the age of the data. For example, the older the data is, the smaller the contribution of the data.

Figure 5:
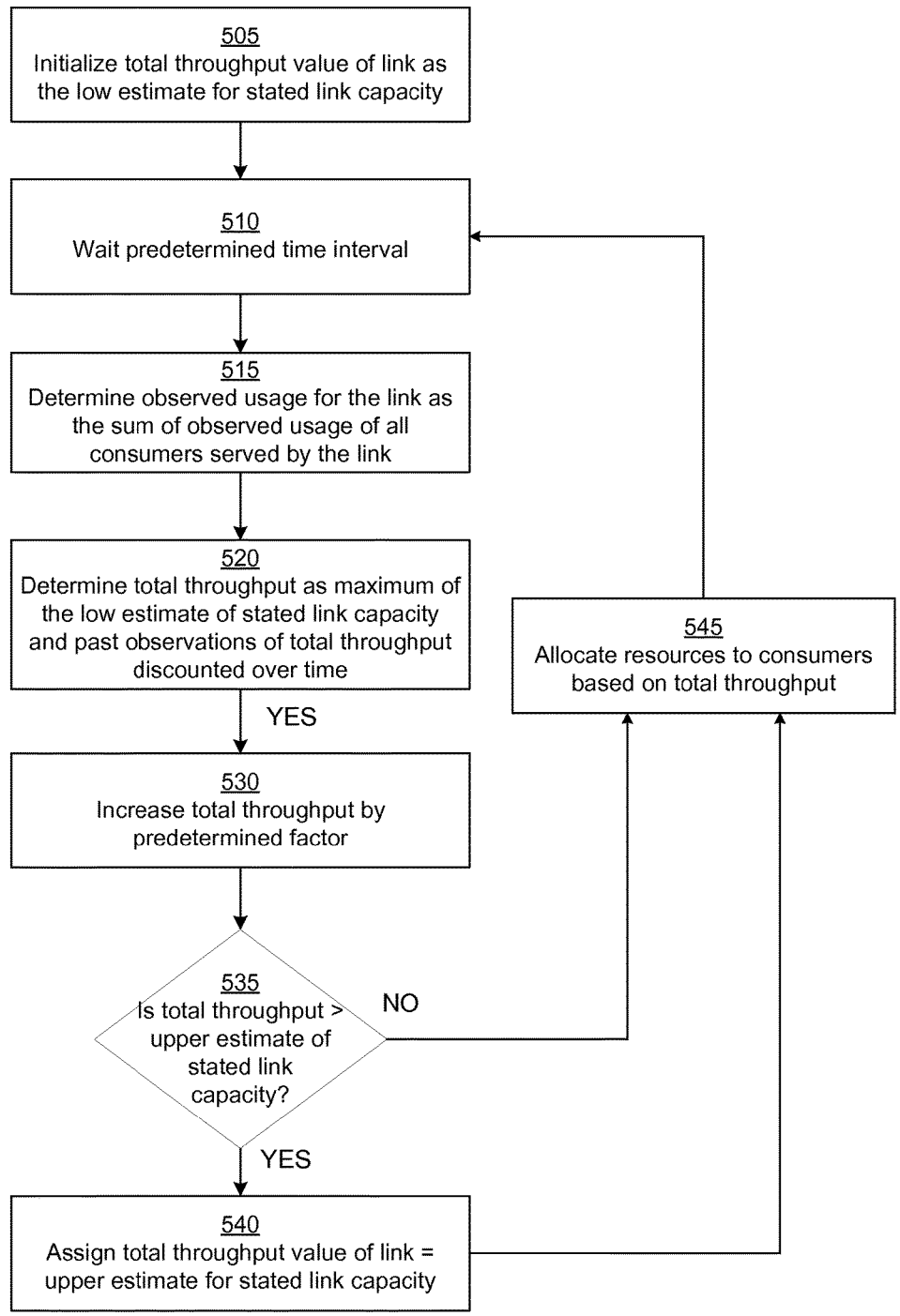
FIG. 5 shows a flowchart of the process used for computing the total throughput of a link, in accordance with an embodiment of the invention.

FIG. 5 shows a flowchart of the process used for computing the total throughput of a link. The allocation manager 225 initially assigns 505 total throughput to a value determined to be a low estimate of the stated link capacity LowEstimateBW. In one embodiment, the low estimate of the stated link capacity is determined to be a fraction of the stated capacity of the network link, for example, half of the stated capacity of the network link. The total throughput value is estimated periodically. Accordingly, the scheduler 235 causes the allocation manager 225 to wait 510 a predetermined interval of time before re-computing the observed usage of links and the value of the total throughput.

The observed usage of a link is determined by estimating the usage of the link by each consumer served by the link. The usage may be estimated based on the consumer's inbound as well as outbound usage of the link. For example, the usage may be based on the total amount of data sent using the link in either direction during a time interval. The time interval for measuring the usage of a link by a consumer can be the predetermined time interval that the allocation manager 225 waits 510 before re-computing the TotalThroughput value for the link. For example, the time interval for measuring the usage of a link by a consumer can be 30 seconds and the data transferred measures using kilobytes. The observed usage for a link during a time interval is the total of the current usage of all consumers of the link during the time interval. In case of resources that are network links, the usage is measured in both directions, sending and receiving.

Based on the observed usage ObservedUsage of the link in the current time interval as well as previous time intervals, the allocation manager 225 re-computes 520 the total throughput value using the following equation:

$$TotalThroughput(link) = \MAX\{LowEstimateBW(link), \MAX_{0 \le s \le lookback}(DiscountValue(ObservedUsage(s), t))\} \quad (1)$$

The variable lookback is a parameter to determine the length of historic time interval over which the observed usages are considered for evaluating the total throughput for a link for the current time. The variable t is the present time and variable s represents any time point between t and lookback for which observed usage was determined.

The example of Discounted Value function is DiscountValue(ObservedUsage(s),t)=ObservedUsage(s)*$e^{-a^{*}(t-s)}$. The value e is a constant. Historical values determined earlier than t-lookback time are not considered in the above equation (1) for evaluation of TotalThroughput. Specifically, equation (1) computes the TotalThroughput of a link based on all observed usage values ObservedUsage over the previous time interval of size lookback.

The ObservedUsage values of previous time points are weighted to reduce the influence of old values on the computation of TotalThroughput. The factor $e^{-a \times (t-s)}$ exponentially reduces the weight of the older values. The above equation keeps the computation of TotalThroughput dynamic so that although the value of TotalThroughput is based on historical values, recent values have more significant impact on the value of TotalThroughput than older values. Accordingly, a temporary increase in observed usage will increase the TotalThroughput value but unless the increase is sustained over significant period of time or observed again, its influence on the computation of TotalThroughput is exponentially reduced over time until it is completely eliminated from the computation after lookback time interval.

Alternative embodiments may utilize other functions to reduce the weight of older observed usages, for example a linear function or non-linear functions can be used. In some embodiments, the weight of all previous observed usages considered is the same and the older observed usages get eliminated after lookback time. The equation (1) ensures that even if observed usage values reduce significantly, the value of TotalThroughput is not reduced below LowEstimateBW. In some embodiments, the value of the lookback parameter can be dynamically adjusted. The value of the lookback parameter can be manually changed by a system administrator or determined based by the allocation manager 225. For example, if the observed usages in the system are changing very slowly, the value of lookback can be increased, whereas if the observed usages in the system are changing more frequently, the value of lookback parameter can be reduced. In an embodiment, changes to lookback parameter can be driven by various 'lookback policies,' for example absolute time (e.g. lookback for a month/quarter/year worth of data), or/and by the amount of data processed, e.g. lookback goes as far as needed to account for 100 TB of data). These lookback policies can be either manual or automatic.

An alternative embodiment uses the following recursive equation for computing the TotalThroughput for the current time indicated by time t and the computation of TotalThroughput for a previous time s.

$$\text{TotalThroughput}(link,t) = \text{MAX}\{\text{LowEstimate}BW(link), \text{ObservedUsage}(t), \text{TotalThroughput}(link,s) \times e^{-a \times (t-s)}\} \quad (2)$$

For the initial time t0, there is no time s before time t for which TotalThroughput value is available. The computation of TotalThroughput for time t0 is based on the value of LowEstimateBW for the link as follows.

$$\text{TotalThroughput}(link,t0) = \text{LowEstimate}BW(link) \quad (3)$$

The equation (2) computes the TotalThroughput value for time t based on the TotalThroughput value for a previous time point weighted by an exponential factor depending on the time difference between t and s. Alternative embodiments can use a different function to determine weight applied to the previous TotalThroughput value. For example, the weight applied to the previous TotalThroughput value can be a linear function of the time difference between present time and the previous time, a non-liner function or even a constant value. Typical functions used for computing the weights applied to the TotalThroughput value of previous time points attempt at reducing the significance of previous TotalThroughput values in computation of TotalThroughput for current time point.

In another embodiment, an estimate of the true total throughput for the link, True TotalThroughput(link) is computed based on the following equation:

$$\text{TrueTotalThroughput}(link) = \underset{0 \le s \le lookback}{\text{MAX}}(\text{ObservedUsage}(s) \times e^{-a \times (t-s)}) \quad (4)$$

The true total throughput value assumes the LowEstimateBW(link)=0, i.e., it ignores the effect of LowEstimateBW(link) in equation (1). Since equation (1) uses LowEstimateBW link), if the maximum of the weighted past observed usage values is too low, the TotalThroughput(link) value obtained from equation (1) can be higher than the value computed using equation (4). The TrueTotalThroughput(link) value can be used for reporting purposes.

Periodically, the value of all allocations is increased 530 by a factor (called fudge factor), for example, by 10%. The increase of the allocations is intended to cause the allocations to increase and reach a true maximum value of the allocations. The additional amount of resource allocated by the fudge factor may cause the ObservedUsage for the next iteration to increase compared to the previous iteration if the increase in allocation can be consumed. If each iteration increases the allocations by the fudge factor, the TotalThroughput increases in each iteration until the aggregate needs of all consumers of the resources are satisfied or the actual maximum throughput value based on the constraints of the resources is reached. When the needs of all consumers of the resources are satisfied or the actual maximum throughput value based on the constraints of the resources is reached, the additional resources introduced by the fudge factor are not consumed. As a result the observed TotalThroughput is not increased at time t.

If the TotalThroughput value determined by increasing 530 the TotalThroughput by the fudge factor is determined 535 to be higher than an upper estimate of the stated link capacity, the TotalThroughput value is assigned 540 to the upper estimate of the stated link capacity. The upper estimate of the stated link capacity may be determined from the stated link capacity, for example, 90% of the stated link capacity for each link. Typical inefficiencies of any practical system disallow the system to reach stated link capacities for the available links. Therefore, the TotalThroughput value for a link is limited to a maximum value based on the upper estimate of the stated link capacity. Whether the TotalThroughput is limited to the upper estimate of the stated link capacity or determined by applying the fudge factor to the re-computed 520 TotalThroughput value, the allocation manager 225 allocates 545 resources to consumers based on the total throughput. Since the total throughput is increased by a predetermined factor, the consumers may receive additional resources compared to their observed usage. The allocation manager 225 waits 510 for the predetermined interval and determines 515 the observed usages for the link and also determines 520 the TotalThroughput value. Some consumers may be able to utilize the additional allocated resources whereas other consumers may not need the additional allocated resources.

It is possible that the value of TotalThroughput for an iteration is over estimated. For example, the value of TotalThroughput can be overestimated if the system is reconfigured to change the network or storage resources available or there is a significant change in the load distribution. A change in load distribution may occur, for example, if the load is switched from sequential input/output (IO) used for analytical applications to transactional load dominated by smaller IO operations that are randomly occurring. Since TotalThroughput is determined based on historical observations, the estimated TotalThroughput value may be larger than the changed throughput value available to the resources on a link. The overestimate of the available resources may lead to additional resources being allocated to the consumers, based on phantom portion of resource that does not actually exist. However the decay of historical TotalThroughput values over time accounted for in equations (1,2) and the elimination of historical values prior to the lookback time interval causes the extra allocation of resources to reduce and get eliminated over time causing the TotalThroughput value to reach a realistic estimate. In an embodiment, a system administrator is allowed to reset the TotalThroughput value to initial default value, causing the allocation manager 225 to re-compute the TotalThroughput value from scratch. An embodiment allows the allocation manager 225 to automatically reset the TotalThroughput value to initial default value either periodically or based on detection of particular events, for example, changes in network configurations or events that indicate significant load changes, for example, addition or deletion of a production database system 110 from the database storage system 100 configuration.

Resource Guarantees

Typical consumers of resources in a system similar to the system illustrated in FIG. 1 may require a minimum amount of resources to operate. For example, a module acting as a consumer may be required to send a periodic message stating its status. The status signal may be required to detect system failures, for example, modules may send a signal that indicates "I am alive" to another module in-charge of monitoring the health of various sub-systems or modules. If no signal is received from a module or sub-system, the system 100 may activate procedures to detect hardware or software failures in order to take appropriate action.

There may be other reasons for guaranteeing minimum availability of resources to specific systems. For example, a virtual database manager 275 interacting with a virtual database system 130 may need minimum amount of resources to continue a meaningful mode of processing for a particular task. Although the allocation manager 225 allocates minimum amount of resources to specific consumers, the usage of these consumers may need to be minimized to favor higher priority consumers. In an embodiment, a survival level resource allocation may be guaranteed to each consumer process created in the system and the consumer process needs to be suspended or deleted to reclaim the survival minimum resources allocated to the consumer. Note that suspension of a consumer process only stops real time activity of this consumer (data access, network traffic, etc) and frees all resources associated/guaranteed to this consumer but does not destroy storage of data associated with this consumer. For example, deleting a consumer process associated with a virtual database does not require deletion of the storage associated with the VDB.

In an embodiment, the survival minimum resource allocation guaranteed to a consumer is configurable by a system administrator. In another embodiment, certain default values may be assigned to different categories of consumers based on their priorities in the system.

The minimal resource guarantee for a consumer in the system 100 is the minimal amount of resource that is made available by the allocation manager 225 to the consumer. If the consumer does not need its allocated minimal resources, the leftover portions of the resources are allocated by the allocation manager to other consumers based on their priority. On the other hand, if the allocation manager 225 determines after allocating higher priority consumers that there are leftover resources for lower priority consumers, the allocation manager 225 can provide additional allocations to the lower priority consumers, over and above the guaranteed minimum allocation. In an embodiment, a system administrator is allowed also to set maximum allocation values for individual consumers. A default value for minimum allocation of consumer resources can be zero, and a default value for the maximum allocation of consumer resources can be infinity.

In an embodiment, in addition to individual guarantees, the system can be configured to have a minimum guarantee for an entire set of consumers as a group, for example, the P2 group 315 shown in FIG. 3. The overall minimum guarantee for the P2 group corresponds to an amount of resources to be distributed among P2 consumers, if the P2 consumers are able to consume the resources. If the P2 consumers are unable to consume all the resources allocated by group minimum guarantee, the unused resources may be allocated to other consumers. The benefit of being able to configure a minimum guarantee for a group of consumers is to prevent the group of consumers (for example, P2 group) from getting starved of resources by another group of consumers that has higher priority (for example, P1). The value of the minimum guarantee for a group of consumers can be specified by a system administrator or predetermined to a default value, for example, zero. An embodiment automatically derives the minimum guarantee automatically based on historical data. For example, group guarantee can be set as a fixed percentage of the historically observed total group usage. Alternatively, the resource needs of the group are observed in the time periods when the workload is not dominated by the high priority consumers (unconstrained periods). Based on that resource needs of the group, the group guarantee is determined so as to always provide the group with at least 65% of its estimated total need.

The overall minimum guarantee for a group may be either set individually for each link or set globally and then distributed across links. In the later case, the embodiment does this in proportion to the group traffic on the link.

$$GroupGuarantee(link) = \frac{GroupGuarantee \times GroupThroughput(link)}{\sum_{link \in LINKS} GroupThroughput(link)} \quad (5)$$

In the above equation (4), the Group Guarantee(link) is the minimum guarantee for a group, for a specific link. The GroupGuarantee is the overall minimum guarantee for the group. The GroupThroughput(link) is the total throughput of the traffic generated by the group for a specific link. The value $$\sum_{link \in LINKS} GroupThroughput(link)$$

represents the sum of the GroupThroughput(link) values for all links, where LINKS is the entire set of links.

When a new guarantee value is set for a consumer, the allocation manager 225 may check various constraints including the following: (1) The sum of individual guarantees and survival guarantees for all the consumers in a group (for example P2), does not exceed the overall guarantee for the group. (2) The sum of the individual guarantees and survival guarantees for all the consumers in a group is below the low estimate for bandwidth for the link LowEstimateBW (link) which is determined as a predetermined fraction of the stated capacity of the link. (2) The overall guarantee specified for the group is below the LowEstimateBW(link) value. If any of the above checks fails, a warning may be generated, for example, to inform the system administrator of a constraint violation related to guarantees. These checks ensure that the resources guaranteed are definitely available, for example if the overall capacity estimate is reduced. In an embodiment, the guarantees are in absolute terms, not as percentage of the estimate.

Resource Allocation

Figure 6:
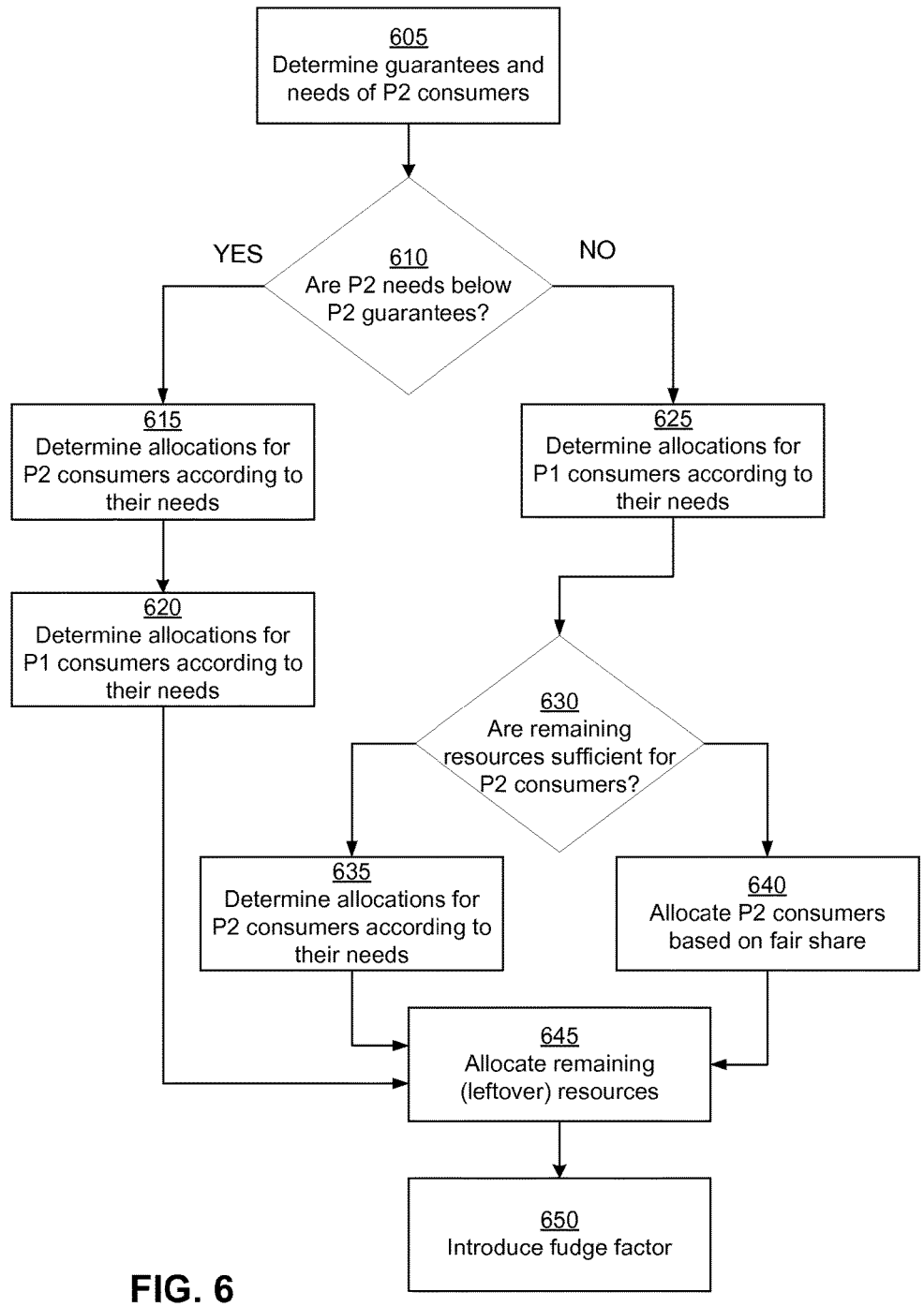
FIG. 6 shows a flowchart of the process used for allocating the resources among consumers, in accordance with an embodiment of the invention.

FIG. 6 shows a flowchart of the process used for allocating the resources among consumers. The process illustrated in FIG. 6 assumes consumers are classified into two sets, P1, and P2. The consumers in priority group P1 are higher priority consumers compared to consumers in priority group P2. The process in FIG. 6 guarantees that the P1 consumers are given priority over P2 consumers while the guarantees for P2s are preserved. Allocations are determined for P1 consumers before P2 consumers, unless it is known that the needs of the P2 consumers are very low and are not causing any risk to the allocations of P1 consumers.

Initially, the survival guarantees of the consumers in set P2 are allocated 605. The group guarantees of the consumers of P2 priority group represent the amount of resources available to the consumers collectively if they can use the resources made available. The unused amount is returned to a common allocation pool. The guarantees of the consumers of P2 priority group are designed to protect the consumers of the lower priority P2 group from being starved by the consumers of the higher priority P1 group.

The needs of the P2 consumers are determined 605 to check 610 if the needs of the P2 consumers are below the P2 guarantees. The needs of a consumer are determined based on the observed usage of the consumer. In an embodiment, a consumer is given an additional margin over and above the observed usage. The addition of the margin allows identification of consumers whose needs are growing. In an embodiment, the value of the margin by which the observed usage is increased for a consumer depends on the priority and sub-priority of the consumer as shown in FIG. 3. The following table shows an example of margins determined based on the priority and sub-priority of a consumer.

| Priority (P) | Sub-priority (S) | Margin (%) |
|---|---|---|
| P1 | High | 25 |
| P1 | Medium | 23 |
| P1 | Low | 20 |
| P2 | High | 18 |
| P2 | Medium | 15 |
| P2 | Low | 10 |

Each row of the above table shows the margin value (third column) as a percentage of increase for a consumer with priority P (first column) and sub-priority S (second column). The values shown in the above table are example values. Each system may determine different set of values by tuning the parameters appropriately. In other embodiments the margin can be a function depending on observed usage. The new usage NewUsage(C) of a consumer C is determined by increasing the observed usage ObservedUsage(C) by the margin percentage. In an embodiment, the computation of NewUsage(C) value for a particular consumer can enforce a maximum value MAX(C). The calculation is shown in the equations (6,6a) below. The components of the formula are: the minimum individual guarantee for the consumer, the survival minimum value assigned to the consumer and projected need of the consumer with the margin. The needs of the P2 consumers is the total of NewUsage(C) values for all consumers of the priority group P2. The margin for priority P and sub-priority S is indicated by MARGIN(P,S).

$$\text{NewUsage}(C) = \text{MAX}\{\text{MinGuarantee}(C), \text{MinSurvival}(C), \text{ObservedUsage}(C) \times (1 + \text{MARGIN}(P,S))\} \quad (6)$$

$$\text{NewUsage}(C) = \text{MIN}\{\text{NewUsage}(C), \text{Max}(C)\} \quad (6a)$$

If P2 consumers needs are determined to be below the guarantees of the P2 consumers, first the allocations for P2 consumers are determined 615 based on their needs, followed by allocations of P1 consumers determined 620 based to their needs. Since the needs of the P2 consumers are known to be below their guarantees, their allocations can be determined before the allocations of P1 consumers. Since the P2 consumers are expected to consume less resources then the amount they are guaranteed they are not causing any risk to P1 consumers of being allocated less resources. In an embodiment, a greedy algorithm described herein is used for determining 615 the allocations for P2 consumers. The greedy algorithm sequentially allocates the resources to the different consumers, going thorough the list of the consumers in order of decreasing priority. Since the needs of the P2 consumers were determined 610 to be less than the guarantees for the P2 consumers, it is likely that after allocating all resources for the P2 and P1 consumers, there are leftover resources. The remaining (leftover) resources are allocated 645 to all the consumers. In an embodiment, the remaining resources may be allocated 645 proportional to the needs of the consumers. In another embodiment, the allocation 645 of the remaining resources may be weighted by the priority/sub-priority of the consumer.

If the P2 needs are above the P2 guarantees, first the amount of resources equal to (TotalThroughput−P2Guarantees−AllSurvivalMinimumAllocations) is allocated to P1 consumers 625 based on their needs. Since the needs of the P2 consumers are higher than their guarantees, it is possible that if the P2 consumers are allocated resources before the P1 consumers, there may not be sufficient resources left for P1 consumers. After the resources required for P1 consumers are determined 625. the remaining resources are checked 630 to determine if there are sufficient resources left for P2 consumers. If there are sufficient resources left for the P2 consumers, the allocations for the P2 consumers are determined 635 based on their needs, for example, based on a greedy algorithm. After allocations for P2 consumers are also determined 635, the remaining leftover resources can be allocated 645. If after determining 625 allocations for the P1 consumers, it is determined that the remaining resources are not sufficient for the P2 consumers, the resources are allocated to P2 consumers based on a fair share strategy described below. In this situation, it is highly likely that there are no more leftover resources. However, if any leftover resources are found, they are allocated 645. After the leftover resources are allocated, a fudge factor may be introduced to find the maximum capacity as described above for step 535 in FIG. 5.

Allocation Strategies

Figure 7:
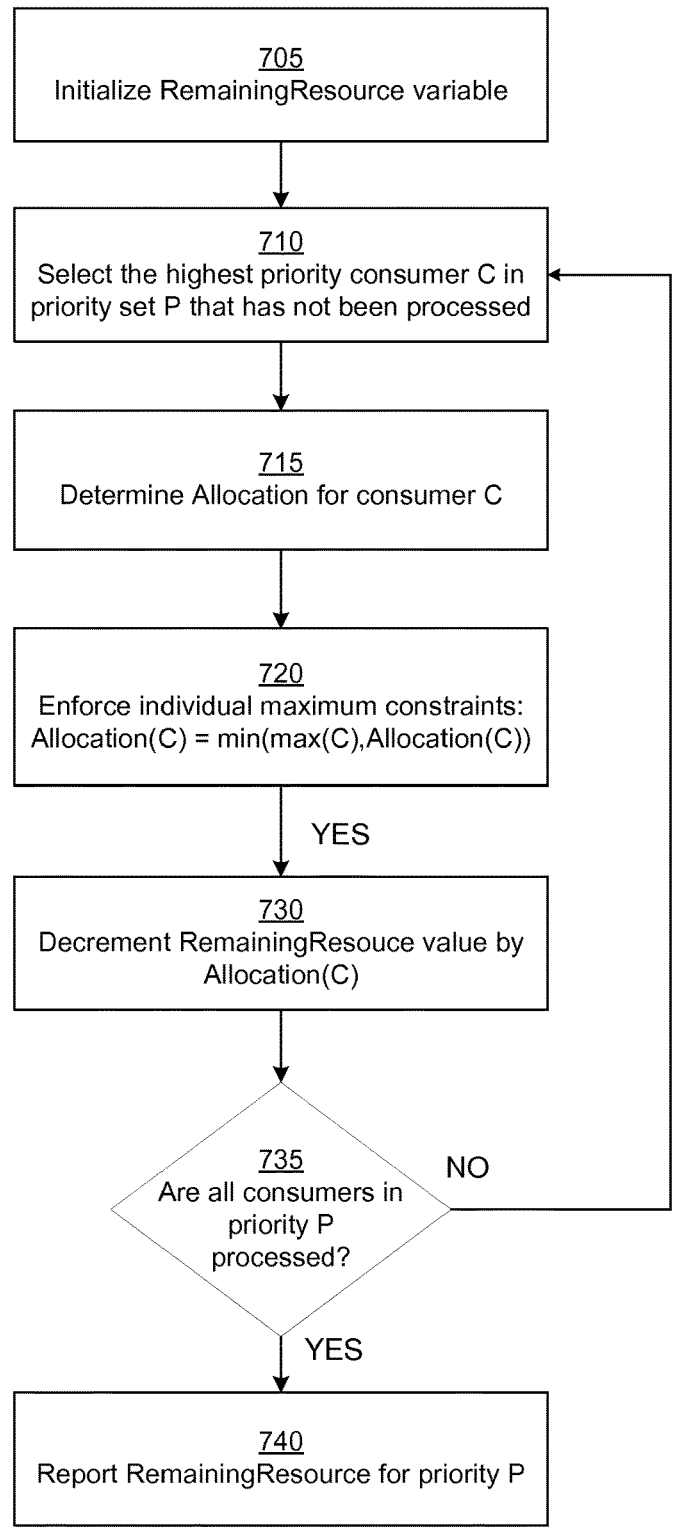
FIG. 7 shows a flowchart of the process used for allocating the resources among consumers of a priority group based on a greedy or a fair share strategy, in accordance with an embodiment of the invention.

FIG. 7 shows a flowchart of the process used for allocating the resources among consumers of a priority group based on a greedy or a fair share strategy. A variable RemainingResource is initialized to a value representing the remaining resources at the stage at which the process shown in FIG. 7 is executed. The process iterates over all the consumers of the priority group in order of decreasing priority. For example, the consumers within the priority group P may be divided into subgroups that are assigned sub-priorities as shown in FIG. 3. The consumers of priority P2 may be processed in the order: consumers with priority P2 and sub-priority high, followed by consumers with priority P2 and sub-priority medium, followed by consumers with priority P2 and sub-priority low. Accordingly, a consumer C with the highest priority/sub-priority that hasn't been processed is selected 710.

The allocation for the consumer selected 710 is determined 715. The strategy used for determining 715 the allocation for consumer C is different for the greedy allocation compared to the fair share allocation. For greedy allocation, the allocation for consumer C is determined to be the NewUsage(C) see formula (6). Therefore, in the greedy allocation strategy, the consumer is allocated as much as the consumer needs based on its NewUsage value which already takes into account the guarantees In the fair share allocation strategy, the allocation for the consumer may be less than the NewUsage value determined for the consumer. First a FairShare(C) value is determined for the consumer using the equation (7) below:

$$FairShare(C) = R \times \frac{W(C)}{\sum_{ci \in Consumers} W(ci)} \quad (7)$$

The fair share value for a consumer FairShare(C) is determined based on the fraction of resources R allocated to the consumer C compared to the total resource allocated for all consumers ci in the set Consumers of the priority group. W(c) is a weight assigned to consumer C. Weights are designed to reflect the priority and subpriority of the consumers. The allocation for consumer C is determined to be min(NewUsage(C),FairShare(C)). Therefore, the allocation of a consumer C may be limited by the FairShare(C) value computed for the consumer, even if the consumer C needs NewUsage(C) resources.

The leftover allocation 645 divides remaining allocations after resource allocations for all consumers have been determined based on greedy or fair share allocation strategies. Leftover allocations may not be provided to consumers that have reached their maximum allocations. In an embodiment, if the resources are determined to be lightly loaded, the leftover resources are divided equally among all consumers. The previously determined allocations of all consumers are incremented by the amount obtained by equally dividing the leftover resources among all consumers. In one embodiment the system may be determined to be lightly loaded for a link if the number of consumers using the link is low and the observed usages of consumers using the link is also determined to be low. For example, the system may be considered lightly loaded for a link if there are fewer than 50 consumers using the link and the overall observed usage of the link is less than a quarter of the stated link capacity.

If the lightly loaded conditions are not met, the resources are divided between consumers in proportion of usage and weight of the consumers. The weight associated with a consumer is based on priority preferences, for example, the weight may be determined based on the priority and sub-priority associated with the consumer. The following equation shows how the share Share(C) of a consumer C is determined for leftover resources R.

$$Share(C) = R \times \frac{W(C) \times NewUsage(C)}{\sum_{ci \in Consumers} W(ci) \times NewUsage(ci)} \quad (8)$$

The share of a consumer Share(C) of the remaining resource R is determined based on the weighted fraction of the usage of consumer C compared to the weighted usage for all consumers ci in the set Consumers of the priority group. Based on the equation (8) above, the total of all Share(C) for all consumers adds up to the remaining total resource. Shares of consumers with the same usage are proportional to weights determined by their priorities and sub-priorities. Furthermore, shares of consumers within the same priority/sub-priority groups are proportional to their usage. The allocations of resources for consumers determined previously are updated by adding the corresponding Share(C) value to each allocation. If the resulting value exceeds the maximum limit configured for the consumer, the allocation is limited to the maximum limit. Based on the above updates to allocations, the value of remaining resources is computed again. If for any reason there are still remaining resources, the above allocation can be repeated.

Metrics for Reporting

In an embodiment, an unhappiness index is determined by the metrics manager 265 as a measure of potential of starvation for a particular consumer. The metric is based on the fraction of a time interval during which the usage of the consumer exceeds a predetermined percentage of allocation, for example, 85% of allocation. In an embodiment, the unhappiness index is measures over a fixed time window, for example, 24 hours. During the fixed time window, there can be several allocation runs during which the allocation manager 225 re-computes the allocations for the next time interval. The time interval between two allocation runs is called an allocation interval and corresponds to the time during which the previous allocation was enforced.

The unhappiness index is determined as the sum of all allocation intervals ti within the time window TWINDOW when the usage of consumer C usage(C,ti) was greater than N % divided by the size of the TWINDOW. In an embodiment, N=85%. Equation (9) below shows the computation of the unhappiness index for a consumer C during the time window Unhappiness(C,TWINDOW).

$$Unhappiness(C, TWINDOW) = \quad (9)$$
$$\frac{\sum_{ti \in TWINDOW} if(usage(C, ti) > N\%)THEN(ti)ELSE(0)}{TWINDOW}$$

The summation in the numerator of (9) adds the time interval ti when the usage of consumer C during ti, usage (C,ti) is greater than N %. The denominator of equation (9) adds all the time intervals ti within the window TWINDOW thereby providing the time of the entire time window TWINDOW. In an embodiment, the consumers are ordered in decreasing order of their unhappiness index to obtain their unhappiness rank. The unhappiness tank and unhappiness index of the consumers may be reported by the metrics manager 265 to a system administrator, for example, via a user interface 295. The system administrator may decide to change the priority or sub-priority of the consumer based on the unhappiness index combined with other criteria for example, the type of the task. In an embodiment, the metrics manager 265 may provide the information regarding unhappiness of consumers to allow the allocation manager to make automatic adjustments to the priority or sub-priority of the consumers. In an embodiment, the unhappiness measure of a consumer is used for automatic adjustment of priority/sub-priority of the consumer. For example, if a consumer is unhappy most of the time, the consumer may be automatically promoted to a higher priority.

Computing Machine Architecture

Figure 8:
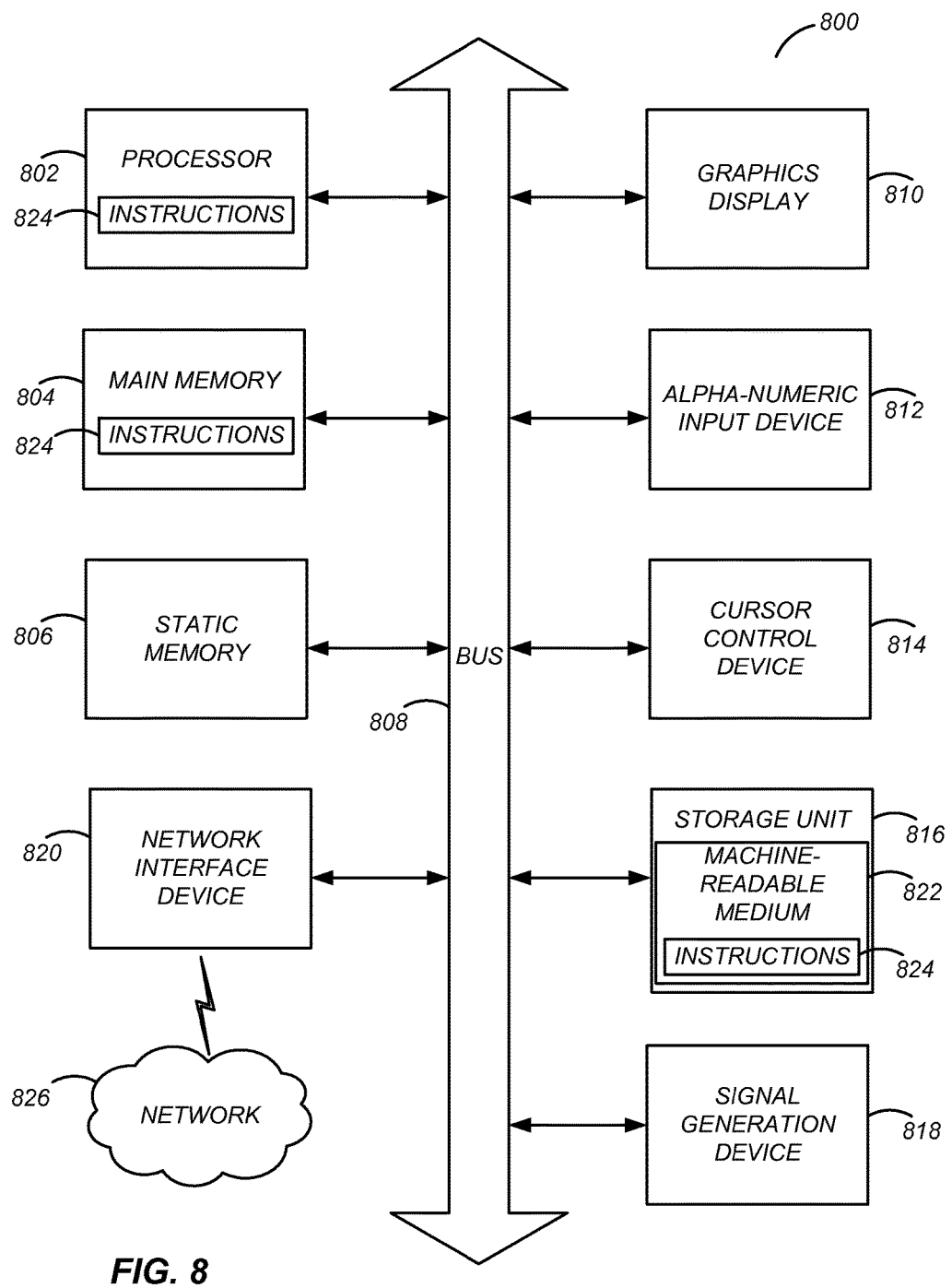
FIG. 8 illustrates an embodiment of a computing machine that can read instructions from a machine-readable medium and execute the instructions in a processor or controller.

FIG. 8 is a block diagram illustrating components of an example machine able to read instructions from a machine-readable medium and execute them in a processor (or controller). Specifically, FIG. 8 shows a diagrammatic representation of a machine in the example form of a computer system 800 within which instructions 824 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 824 (sequential or otherwise) that specify actions to be taken by that machine. Further, while only a single machine is illustrated, the term "machine" shall also be taken to include any collection of machines that individually or jointly execute instructions 824 to perform any one or more of the methodologies discussed herein.

The example computer system 800 includes a processor 802 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 804, and a static memory 806, which are configured to communicate with each other via a bus 808. The computer system 800 may further include graphics display unit 810 (e.g., a plasma display panel (PDP), a liquid crystal display (LCD), a projector, or a cathode ray tube (CRT)). The computer system 800 may also include alphanumeric input device 812 (e.g., a keyboard), a cursor control device 814 (e.g., a mouse, a trackball, a joystick, a motion sensor, or other pointing instrument), a storage unit 816, a signal generation device 818 (e.g., a speaker), and a network interface device 820, which also are configured to communicate via the bus 808.

The storage unit 816 includes a machine-readable medium 822 on which is stored instructions 824 (e.g., software) embodying any one or more of the methodologies or functions described herein. The instructions 824 (e.g., software) may also reside, completely or at least partially, within the main memory 804 or within the processor 802 (e.g., within a processor's cache memory) during execution thereof by the computer system 800, the main memory 804 and the processor 802 also constituting machine-readable media. The instructions 824 (e.g., software) may be transmitted or received over a network 826 via the network interface device 820.

While machine-readable medium 822 is shown in an example embodiment to be a single medium, the term "machine-readable medium" should be taken to include a single medium or multiple media (e.g., a centralized or distributed database, or associated caches and servers) able to store instructions (e.g., instructions 824). The term "machine-readable medium" shall also be taken to include any medium that is capable of storing instructions (e.g., instructions 824) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to these signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating virtual databases from point-in-time copies of production databases stored in a storage manager. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for allocating a network resource used by a plurality of consumers based upon a total throughput of the network resource, wherein the total throughput is a measure of the aggregated network bandwidth available to the plurality of consumers using the network resource, the method comprising:
   initially allocating the network resource for each consumer in the plurality of consumers using a low estimate of bandwidth based on a fraction of a stated link capacity as the total throughput of the network resource, wherein an allocation of the network resource for each consumer determines availability of network resource to the consumer for a subsequent time interval;
   iterating, over one or more cycles:
      determining a plurality of cumulative usage values of the network resource, wherein each cumulative usage value is associated with a time interval and is based on observed usages of the network resource by a corresponding consumer of the plurality of consumers over the time interval, wherein each consumer represents a process executing on a computer system and accessing a database storage system via the network resource;
      determining a total observed throughput of the network resource based on an aggregate of the plurality of cumulative usage values of the network resource, wherein each of the plurality of cumulative usage values is weighted based upon a non-zero weight value determined as a decreasing function of the age of the time intervals relative to a current time associated with the cumulative usage values;
      determining a total amount of the network resource to allocate to the plurality of consumers based upon the determined total observed throughput of the network resource increased by a predetermined factor;
      responsive to determining that the determined total amount is above a predetermined threshold value, using a high estimate of bandwidth based on a fraction of the stated link capacity as the total amount; and
      allocating the network resource for each consumer in the plurality of consumers, based on the determined total amount.

2. The method of claim 1, wherein the weight values linearly decrease with the age of the time intervals associated with the cumulative usage values.

3. The method of claim 1, wherein determining the total throughput value excludes cumulative usage values outside a predetermined time interval.

4. The method of claim 1, wherein the weight values decrease with the age of the time intervals associated with the cumulative usage values based upon an exponential function.

5. A computer readable non-transitory storage medium, storing instructions for:
   initially allocating the network resource for each consumer in the plurality of consumers using a low estimate of bandwidth based on a fraction of a stated link capacity as the total throughput of the network resource, wherein an allocation of the network resource for each consumer determines availability of network resource to the consumer for a subsequent time interval;
   iterating, over one or more cycles:
      determining a plurality of cumulative usage values of the network resource, wherein each cumulative usage value is associated with a time interval and is based on observed usages of the network resource by a corresponding consumer of the plurality of consumers over the time interval, wherein each consumer represents a process executing on a computer system and accessing a database storage system via the network resource;
      determining a total observed throughput of the network resource based on an aggregate of the plurality of cumulative usage values of the network resource, wherein each of the plurality of cumulative usage values is weighted based upon a non-zero weight value determined as a decreasing function of the age of the time intervals relative to a current time associated with the cumulative usage values;
      determining a total amount of the network resource to allocate to the plurality of consumers based upon the determined total observed throughput of the network resource increased by a predetermined factor;
      responsive to determining that the determined total amount is above a predetermined threshold value, using a high estimate of bandwidth based on a fraction of the stated link capacity as the total amount; and
      allocating the network resource for each consumer in the plurality of consumers based on the determined total amount.

6. The computer readable non-transitory storage medium of claim 5, wherein the weight values linearly decrease with the age of the time interval associated with the cumulative usage values.

7. The computer readable non-transitory storage medium of claim 5, wherein determining the total throughput value excludes cumulative usage values outside a predetermined time interval.

8. The computer readable non-transitory storage medium of claim 5, wherein the weight values decrease with the age of the time intervals associated with the cumulative usage values based upon an exponential function.

9. A computer system, comprising:
   a computer processor; and
   non-transitory computer readable storage medium storing instructions for:

initially allocating the network resource for each consumer in the plurality of consumers using a low estimate of bandwidth based on a fraction of a stated link capacity as the total throughput of the network resource, wherein an allocation of the network resource for each consumer determines availability of network resource to the consumer for a subsequent time interval;

iterating, over one or more cycles:
  determining a plurality of cumulative usage values of the network resource, wherein each cumulative usage value is associated with a time interval and is based on observed usages of the network resource by a corresponding consumer a plurality of consumers over the time interval, wherein each consumer represents a process executing on a computer system and accessing a database storage system via the network resource;
  determining a total observed throughput of the network resource based on an aggregate of the plurality of cumulative usage values of the network resource, wherein each of the plurality of cumulative usage values is weighted based upon a non-zero weight value determined as a decreasing function of the age of the time intervals relative to a current time associated with the cumulative usage values;
  determining a total amount of the network resource to allocate to the plurality of consumers based upon the determined observed throughput of the network resource increased by a predetermined factor;
  responsive to determining that the determined total amount is above a predetermined threshold value, using a high estimate of bandwidth based on a fraction of the stated link capacity as the total amount; and
  allocating the network resource for each consumer in the plurality of consumers based on the determined total amount.

10. The computer system of claim 9, wherein the weight values linearly decrease with the age of the time interval associated with the cumulative usage values.

11. The computer system of claim 9, wherein determining the total throughput value excludes cumulative usage values outside a predetermined time interval.

12. The computer system of claim 9, wherein the weight values decrease with the age of the time intervals associated with the cumulative usage values based upon an exponential function.

* * * * *